US012793915B2

(12) United States Patent
Bernard et al.

(10) Patent No.: US 12,793,915 B2
(45) Date of Patent: Nov. 10, 2026

(54) FAST EARTHING SWITCH IMPLEMENTING THE COANDA EFFECT

(71) Applicant: General Electric Technology GmbH, Baden (CH)

(72) Inventors: Félix Bernard, Aix-les-Bains (FR); Olivier Guyon, Aix-les-Bains (FR); Matthias Montbel, Aix-les-Bains (FR); Diana Leguizamon Cabra, Villeurbanne (FR)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 332 days.

(21) Appl. No.: 18/439,956

(22) Filed: Feb. 13, 2024

(65) Prior Publication Data

US 2024/0274384 A1 Aug. 15, 2024

(30) Foreign Application Priority Data

Feb. 14, 2023 (EP) .................................... 23305195

(51) Int. Cl.
*H01H 31/00* (2006.01)
*H02B 13/075* (2006.01)

(52) U.S. Cl.
CPC ......... *H01H 31/003* (2013.01); *H02B 13/075* (2013.01)

(58) Field of Classification Search
CPC ...... H01H 1/385; H01H 31/003; H01H 31/32; H01H 33/04; H01H 33/42; H01H 33/122; H01H 33/90; H01H 33/904; H01H 2033/902; H02B 13/075
USPC ......... 218/16, 12–14, 17, 45, 55, 67, 79–80, 218/100
See application file for complete search history.

(56) References Cited

U.S. PATENT DOCUMENTS

| | | | | |
|---|---|---|---|---|
| 4,413,166 | A * | 11/1983 | Meyer .................... | H01H 31/32 218/80 |
| 8,822,867 | B2 * | 9/2014 | Lee ........................ | H01H 33/06 218/59 |
| 11,031,192 | B2 * | 6/2021 | Kubota .................. | H01H 31/02 |
| 11,451,018 | B2 * | 9/2022 | Kim ..................... | H01H 31/003 |
| 2014/0367360 | A1 * | 12/2014 | Ono ....................... | H01H 33/88 428/141 |

(Continued)

FOREIGN PATENT DOCUMENTS

| | | | |
|---|---|---|---|
| EP | 3422381 | A1 | 1/2019 |
| EP | 3611745 | A1 | 2/2020 |

(Continued)

OTHER PUBLICATIONS

Extended European Search Report issued in EP Application No. 23305195.2 dated Jul. 25, 2023, 8 pages.

*Primary Examiner* — William A Bolton
(74) *Attorney, Agent, or Firm* — Eversheds Sutherland (US) LLP

(57) ABSTRACT

A fast earthing switch for a GIS, including a movable contact rod, having an end; a cylinder, fixed to the contact rod and forming a gas chamber around at least part of the contact rod, the gas chamber including an outlet around the contact rod so that gas can flow along the contact rod and its end when it moves from a closed to an open position; and means for actuating the contact rod between a closed and an open position.

10 Claims, 7 Drawing Sheets

(56) References Cited

U.S. PATENT DOCUMENTS

| | | | | |
|---|---|---|---|---|
| 2019/0139727 | A1* | 5/2019 | Papetti | H01H 31/003 |
| 2022/0076908 | A1* | 3/2022 | Son | H02B 13/045 |

FOREIGN PATENT DOCUMENTS

| | | | |
|---|---|---|---|
| EP | 4105959 | A1 | 12/2022 |
| WO | 2021028138 | A1 | 2/2021 |

* cited by examiner

FAST EARTHING SWITCH IMPLEMENTING THE COANDA EFFECT

TECHNICAL FIELD

The invention relates to the gas-insulated substations, commonly referred to as Gas-Insulated Substations (GISs).

BACKGROUND

The invention relates particularly to fast earthing switches of this type of electrical equipment. Earthing switches make it possible to earth the electrical conductors or bars, depending on the operation of the electrical network running through the equipment or during maintenance operations of this last.

More specifically, a switch comprises a contact rod which penetrates a conductor or bar and which is connected to the casing of the switch.

A gas-Insulated Substation (GIS) is generally insulated using sulfur hexafluoride ($SF_6$) in metal tanks filled with $SF_6$ under pressure, at a service pressure of 0.4 megapascals (MPa) to 0.8 MPa, e.g. 0.7 MPa.

Sulfur hexafluoride (SF6) being estimated to contribute to the greenhouse effect, it was recently replaced by other gases. In particular, a gas called g3 and comprising heptafluoroisobutyronitrile mixed with a dilution gas comprising carbon dioxide and a high content of oxygen is used in replacement of $SF_6$. Such a new gas has a drastically reduced the environmental impact (more than 99% less gas global warming potential (GWP), Comparatively) and operates with no restriction under the same temperature range as $SF_6$ products (down to −30° C.).

But it has been noticed that this new gas is more easily decomposed upon opening any fast earthing switch in a GIS implementing said gas. In particular, this gas is more easily ionized and does not recombine into the original gas. As a consequence, the arc does not stop.

There is therefore the problem of limiting, and even stopping, as fast as possible, the arc during the opening of a fast earthing switch of a GIS, in particular a GIS implementing said g3 gas but also any other alternative gas.

There is therefore the problem of finding a new earthing switch able to perform fast switching operations in a GIS, the GIS being filled with $SF_6$ or alternatively with a gas comprising, for example heptafluoroisobutyronitrile and/or heptafluoroisopropyl trifluoromethyl ketone (also named 2-butanone, 1,1,1,3,4,4,4-heptafluoro-3-(trifluoromethyl)-(CAS No 756-12-7)) and/or $CO_2$ and/or $O_2$ and/or $N_2$ and/or an oxygenated compounds; for example it can comprise both $CO_2$ and a fluorinated compound, for example heptafluoroisobutyronitrile and/or heptafluoroisopropyl trifluoromethyl ketone.

SUMMARY OF THE INVENTION

In order to solve the above problem, the inventors have found a solution to blow more efficiently the arc generated during opening a fast earthing switch.

The invention first concerns an earthing switch for a GIS comprising:

- a movable contact rod;
- a cylinder, fixed to said contact and forming a gas chamber around at least part of said contact rod, said gas chamber comprising an outlet around said contact rod so that gas flows along said contact rod when it moves from a closed to an open position;

- means for actuating said contact rod between a closed and an open position.

The flow of gas at the end portion of the contact rod reduces the temperature of the previously arced gas. The "cooling" of this zone restores the dielectric properties of the gas and the electric arc is interrupted.

Said cylinder can have an end provided with a lip which extends from said cylinder towards the rod and which has an end separated from the rod, thereby forming an outlet slot with the rod.

Said cylinder is for example made of aluminium or of a plastic material.

Preferably, in a fast earthing switch according to the invention:

- a distance ($d_1$) between and end of said cylinder and said end is for example between 10 mm and 60 mm;
- and/or said outlet has a thickness (e) for example between between 3 mm and 10 mm.

The invention also concerns a GIS comprising:

- a metal tank filled with a gas;
- an earthing switch according to the invention, as disclosed above or in this application.

A GIS according to the invention can be filled with $SF_6$, but alternatively it can be filled with, or comprise, an alternative gas, for example comprising heptafluoroisobutyronitrile and/or heptafluoroisopropyl trifluoromethyl ketone (also named 2-butanone, 1,1,1,3,4,4,4-heptafluoro-3-(trifluoromethyl)-(CAS No 756-12-7)) and/or $CO_2$ and/or $O_2$ and/or $N_2$ and/or an oxygenated compounds; for example it can comprise both $CO_2$ and a fluorinated compound, for example heptafluoroisobutyronitrile and/or heptafluoroisopropyl trifluoromethyl ketone. Said alternative gas can decompose and generate much powder as explained above.

The invention also concerns a method for opening an earthing switch of a GIS according to the invention, comprising:

- moving the movable contact rod with respect to the fixed contact, thereby separating the movable contact from the fixed contact;
- blowing a flow of gas along said rod, the gas flowing along the curved end of the contact, thereby quenching the arc.

In a method according to the invention:

- said fixed contact is for example at a voltage between 2 kV and 30 kV after opening of the switch;
- and/or the rod moves at a speed comprised between 1 m/s and 10 m/s during the separation of the movable contact rod from the fixed contact.

DETAILED DESCRIPTION OF SPECIFIC EMBODIMENTS

Figure 1A:
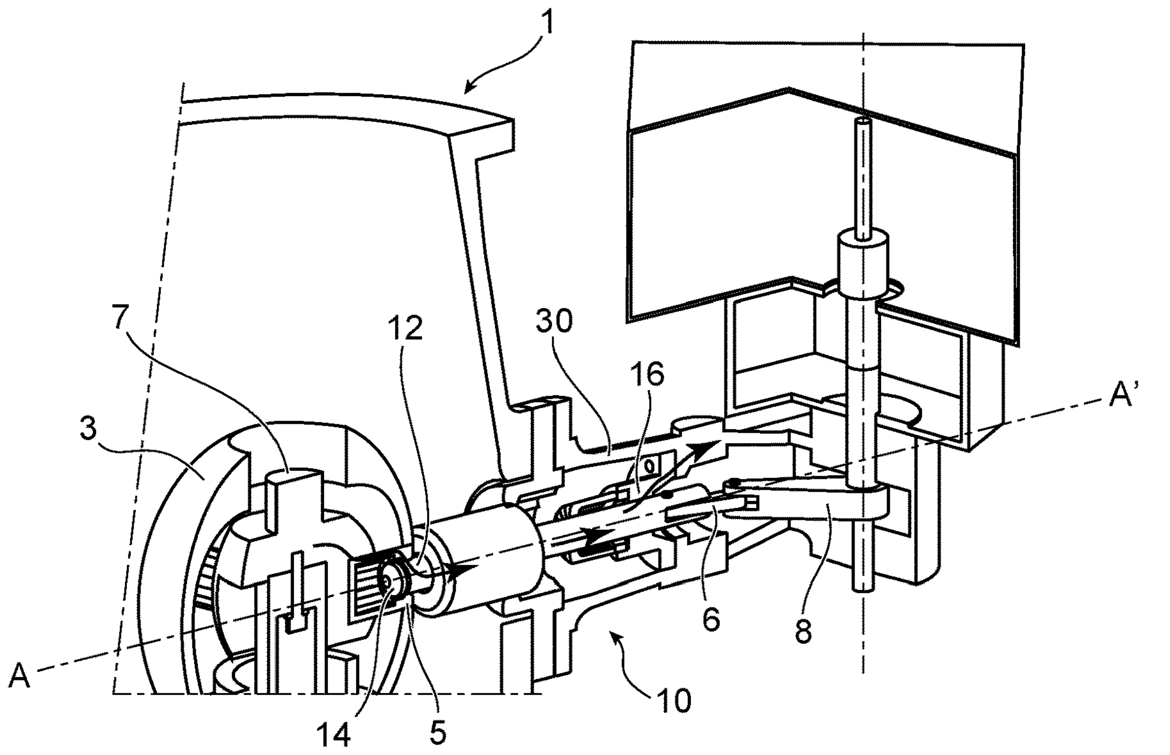
FIGS. 1A and 1B shows an example of a Gas-Insulated Substation and a switch according to an embodiment of the invention.
Figure 1B:
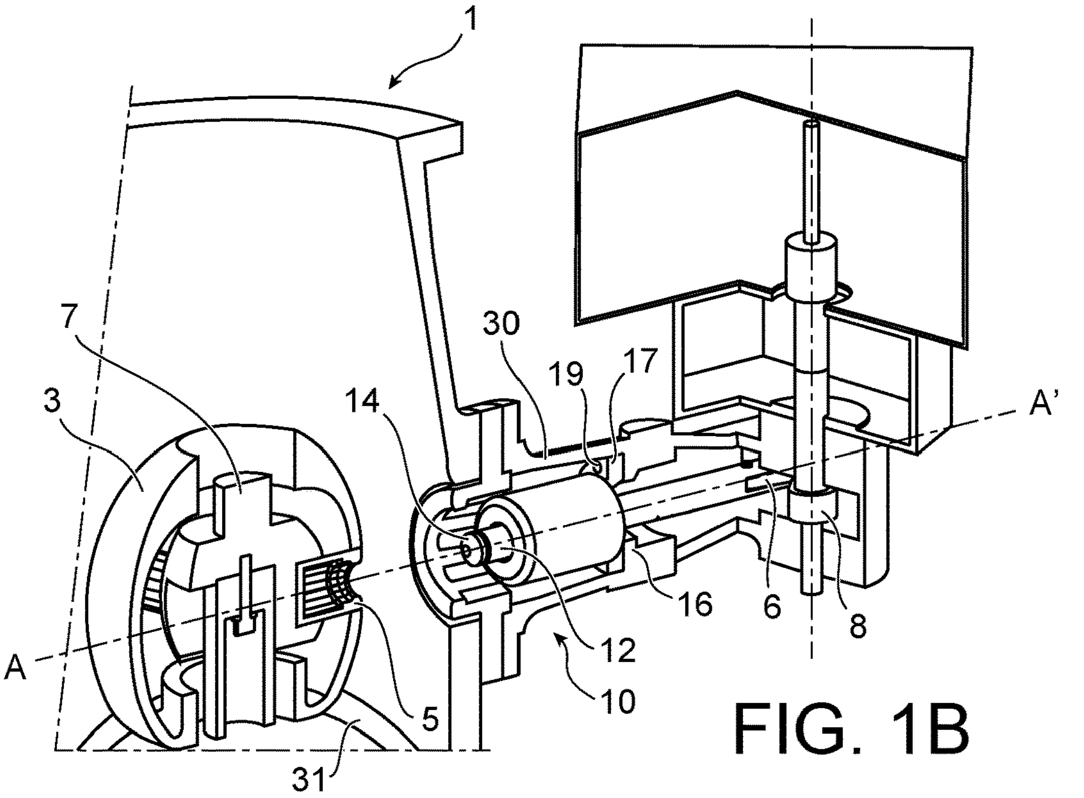

An example of a metal tank 1, or interrupting chamber, comprising a switch 10 according to an embodiment of the invention, is illustrated on FIGS. 1A and 1B.

The metal tank 1 is filled with a gas, for example $SF_6$ or another gas, for example comprising heptafluoroisobutyronitrile and/or heptafluoroisopropyl trifluoromethyl ketone (also named 2-butanone, 1,1,1,3,4,4,4-heptafluoro-3-(trifluoromethyl)-(CAS No 756-12-7)) and/or $CO_2$ and/or $O_2$ and/or $N_2$ and/or an oxygenated compounds; for example said other gas can comprise both $CO_2$ and a fluorinated compound, for example heptafluoroisobutyronitrile and/or heptafluoroisopropyl trifluoromethyl ketone.

An outer part (a conductor forming a corona shield) 3 houses a stationary contact 5, which is itself in contact with an electrical conductor 7 (a conductor forming the inner part of the corona shield). Reference 31 is an electrically insulting part.

An earthing switch 10 can be in contact with said stationary contact 5 (FIG. 1A), thereby connecting it to earth. The stationary contact 5 can comprise a plurality of fingers (they have a tulip shape) for example made of tungsten.

After an interruption, both contacts are separated from each other (FIG. 1B), the stationary contact 5 being for example at a voltage of a few kV, for example between 2 kV and 30 kV.

Figure 2:
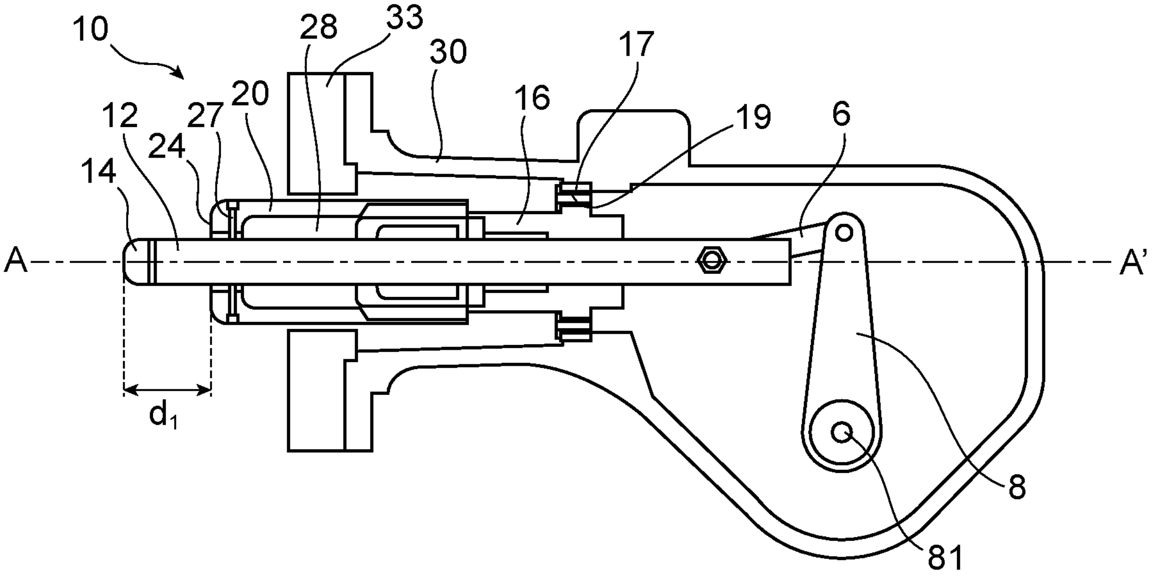
FIGS. 2 and 5 show an example of a switch according to the invention.
Figure 3:
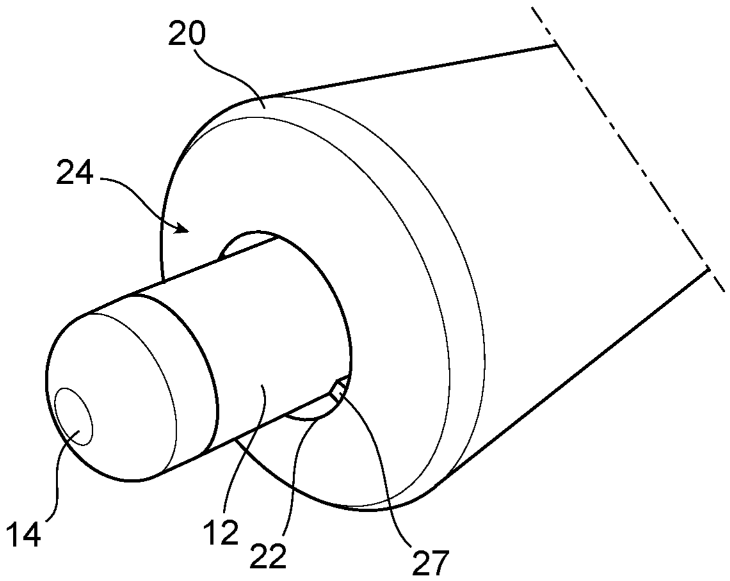
FIG. 3 shows an enlarged front view of a switch according to the invention.

The switch 10 is enclosed in a housing or enclosure 30 (which is fixed to the metal tank 1 and remains fixed with respect to it) and extends along an axis AA' (see FIGS. 1A and 2). The housing or enclosure 30 is for example made of aluminium.

The switch comprises a movable contact rod 12 mounted to move relative to the fixed contact 5 along said axis AA' with help of an actuation system 6, 8. It can move from a closed position (FIG. 1A), in which the electric current can flow through the switch (the contact 5 being earthed) and through lateral contacts 16 of the rod to an open position (FIG. 1B), in which the electric current between the fixed contact 5 and the rod 12 is interrupted and vice-versa. The lateral contacts 16 are made for example of a mixture of Copper and Chromium (Cu—Cr), without tungsten, they can have a tulip shape. They remain fixed with respect to the metal tank 1, the contact rod sliding in them. They are for example mounted on a flange or a collar 17 which is fixed in the housing 30. Openings 19 may be provided in the collar 17 in order to be able to inject gas in the rear part of the housing.

As can be seen on FIG. 2 a switch according to the invention comprises a moving contact made up of a rod 12, comprising an end 14 (a tip) usually made of copper and tungsten (Cu—W) and having preferably a rounded shape. It is for example electron-beam welded to the rest of the rod which is made of Cu—Cr.

Figure 4:
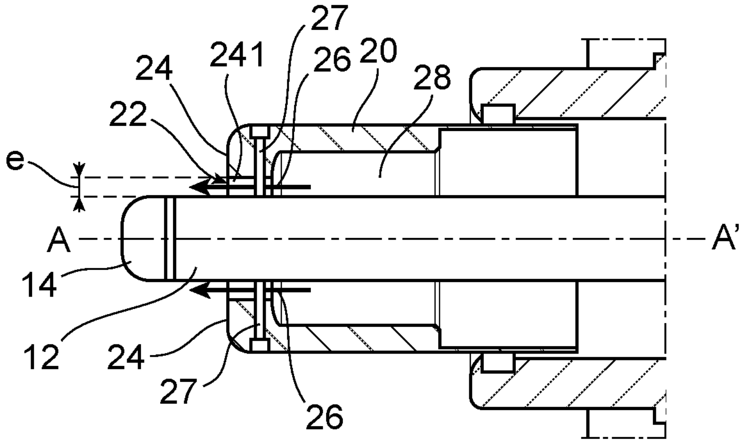
FIG. 4 illustrates a flow of gas flowing along a rod of a switch according to the invention.

A cylinder 20 is fixed to the rod by securing means 27 (for example one or more rivet(s) or screw(s)) and partly surrounds the rod to form a cylindrical gas chamber 28. This gas or blowing chamber has a large volume, for example 0.64 l, when the system is closed (FIG. 1A) and a smaller volume, for example 0.034 l, when the system is open (FIG. 1B and FIG. 2). A lip 24 extends from the cylinder 20 towards the rod 12, but its end 241 does not contact the rod so that it forms an outlet slot 22 with the rod. The distance between the end 241 and the rod 12 (see thickness “e” on FIG. 4) and distance d1 (see FIG. 2) between the end of the cylinder and the end 14 of the rod 12 are chosen so that the gas escaping the chamber stays close to the pin (for example d1 is comprised between 10 mm and 60 mm and e can be comprised between 3 mm and 10 mm). The optimal parameters for each particular configuration can be found by means of experiments or by fluid simulations.

The compressed gas contained in the blowing chamber 28 thus can escape (see the arrows on FIG. 4) through said slot 22, between the end 241 of the lip 24 and the lateral surface of the rod 12, when it is compressed by the cylinder during the opening of the switch, for example at a speed of between 1 m/s and 10 m/s. Actually the compression begins with the beginning of the opening of the switch, which contributes to the efficiency of the quenching process.

The cylinder 20 is made for example of aluminium or of a plastic material. It can slide in the housing 30. An insulating spacer 33 (which can be fixed to housing 30 and to tank 1) closes the gas chamber. Cylinder 20 slides over insulating spacer 33.

Figure 5:
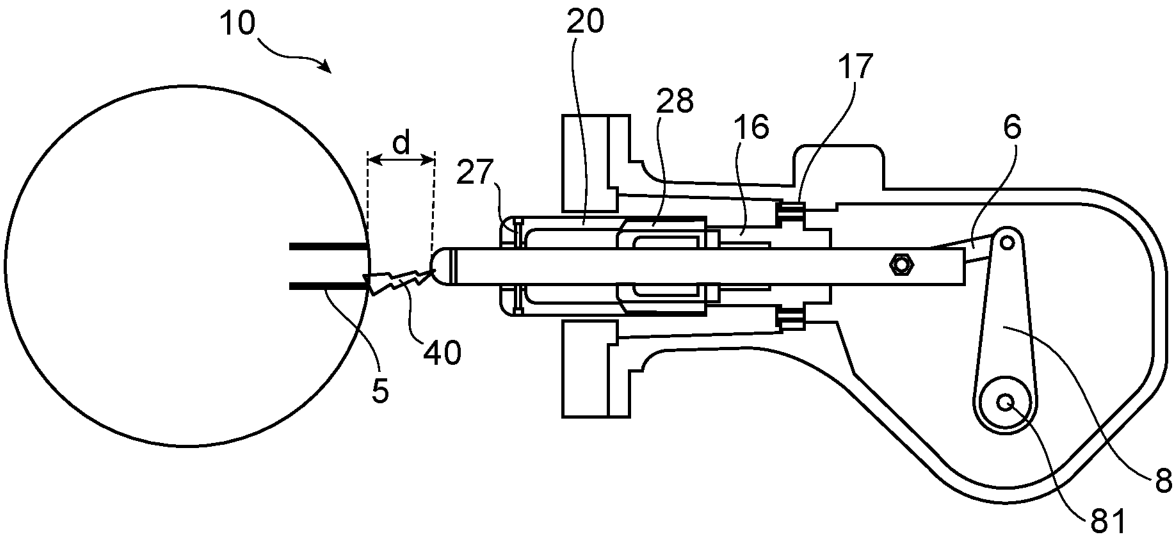

During the opening procedure of the switch 10, the two contacts 5, 12 separate, for example at a speed between 1 m/s and 10 m/s, for example 5 m/s. At a predetermined distance d (see FIG. 5) between the fixed contact 5 (which can be at a few kV, for example between 2 kV and 30 kV) and the end 14 of the rod, an arc 40 is formed, with a current of up to several hundreds of A, for example between 10 A and 500 A. The distance d is for example comprised between 1 cm and 5 cm, it is for example about 4 cm.

Due to the compression of the cool gas in the gas chamber 28, a flow of this gas flows along the surface of the rod 12 towards the end 14. The cool gas then flows along the rounded shaped end 14 due to the Coanda effect, which contributes to a very efficient quenching of the arc. Indeed, there is a sticking effect of the cool gas on the end 14 of the pin. The cool gas then arrives in the arcing zone to cool the arc and interrupts the current of the arc.

An example of an opening process of a switch according to the invention is more precisely illustrated on FIGS. 6A-6D. The same references as above designate the same elements.

Figure 6A:
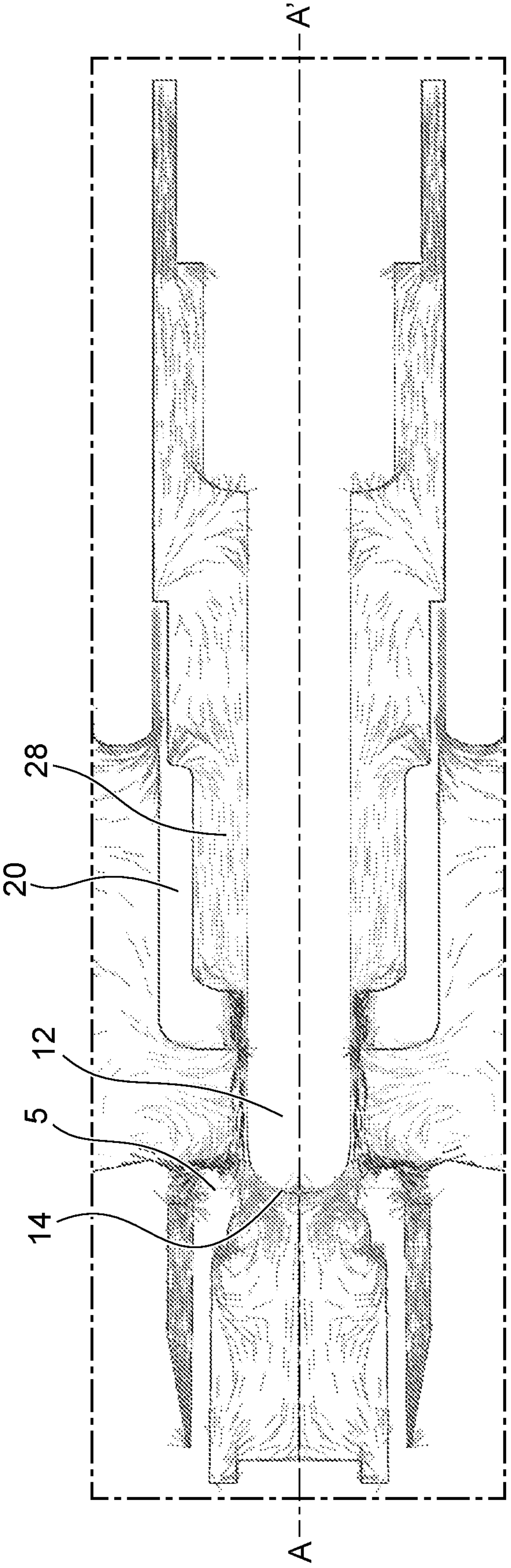
FIGS. 6A-6D show various steps of an opening phase of an earthing switch according to the invention.

A first position is illustrated on FIG. 6A, in which both contacts 5, 12 have just separated. The movable contact travels in the direction of the arrow at a speed of, for example, 5 m/s. The gas contained in the chamber 28 starts being compressed from the separation of both contacts.

Figure 6B:
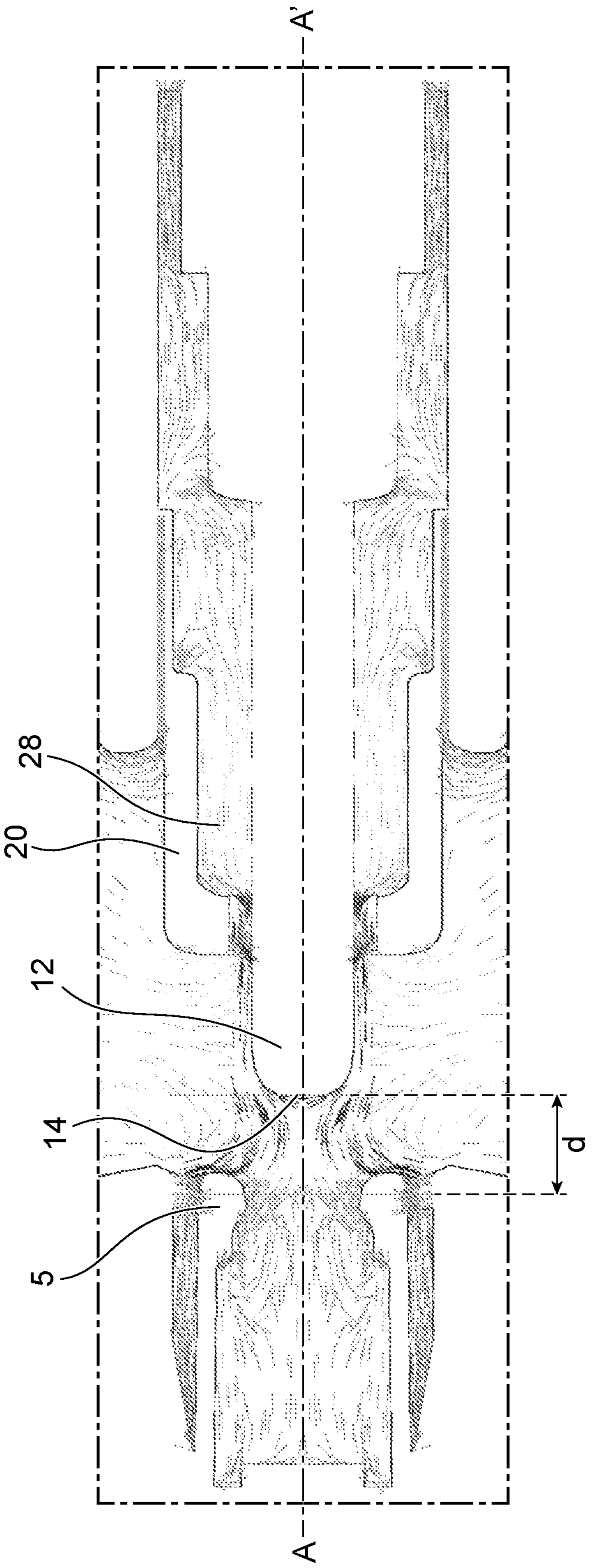

A second position is illustrated on FIG. 6B, the distance d between both contacts 5, 12 is for example between 5 mm and 30 mm, for example about 25 mm. The compressed gas contained in the chamber 28 starts flowing along the rod 12 towards its end 14. The flow of gas is subject to the Coanda effect and follows the rounded shape of the end 14.

Figure 6C:
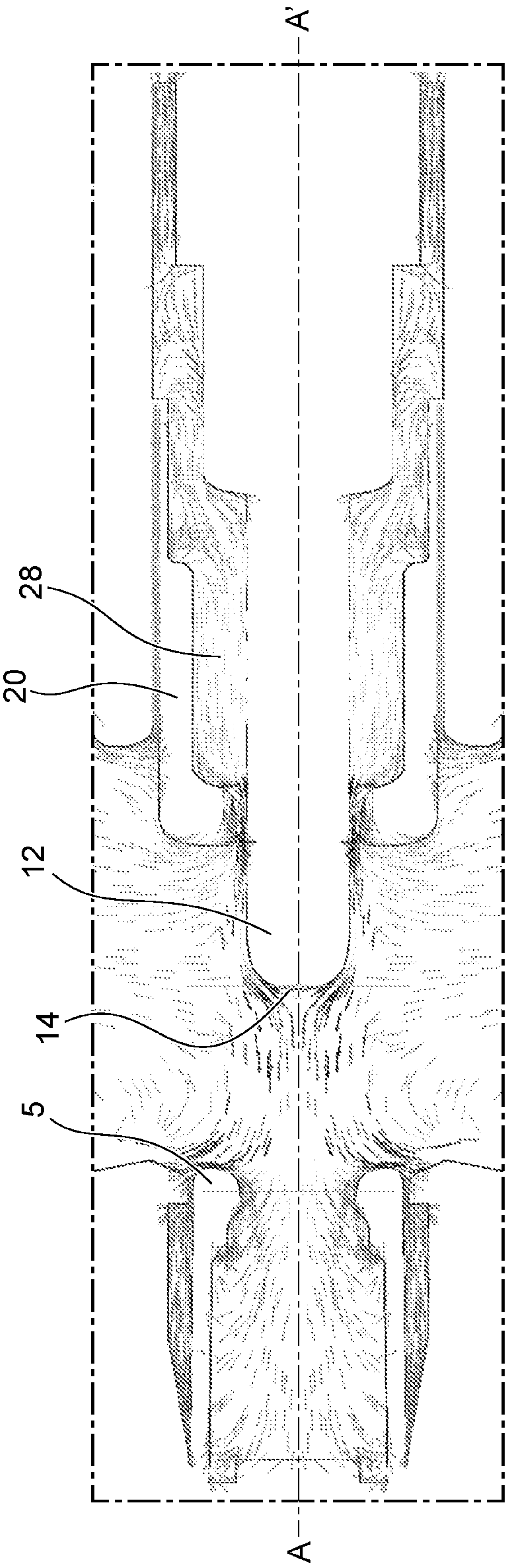

In a third position illustrated on FIG. 6C, the distance between both contacts 5, 12 has increased (it is for example between 30 mm and 60 mm, for example about 50 mm) and the Coanda effect is more important than on FIG. 6B. The speed of the gas which flows out of the blowing chamber has also increased (because of the reduction of the volume of the blowing chamber), it is for example around 20 m/s; this gas comes to the end of the rod and then to the arc ignition point. An arc is generated between the contacts 5 and 12, decomposing the gas; the flow of gas at the end portion 14 reduces the temperature of the previously arced gas in this zone. The “cooling” of this zone restores the dielectric properties of the gas and the electric arc is interrupted.

Figure 6D:
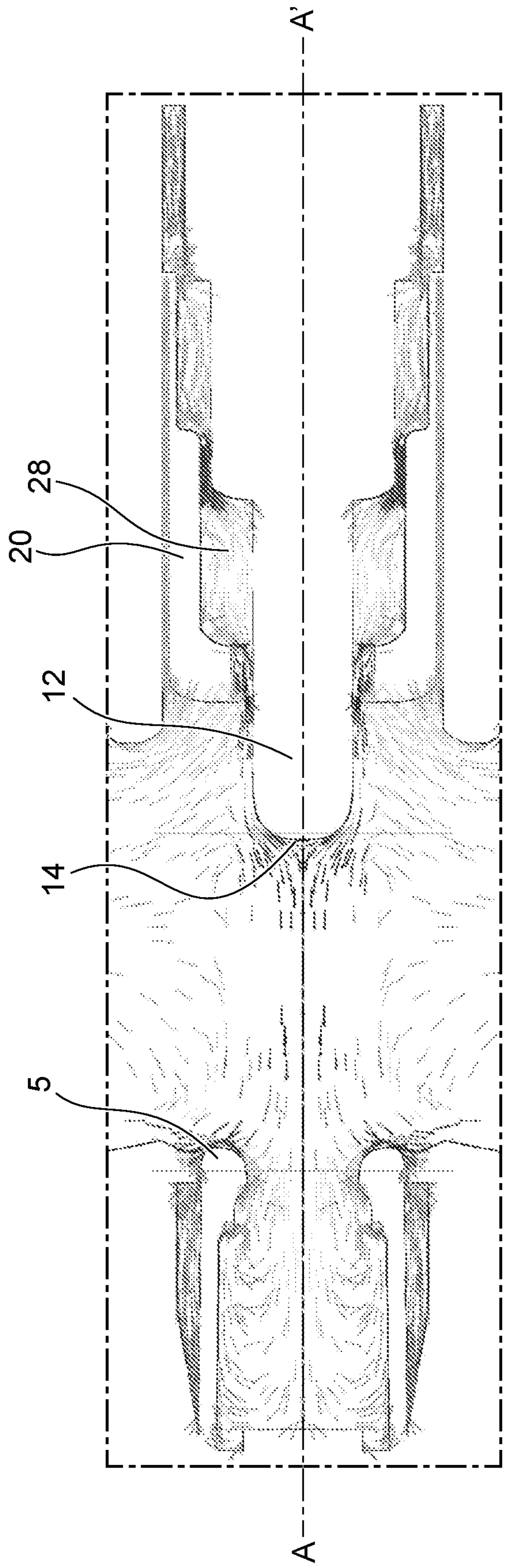

FIG. 6D shows a final position, in which the distance between both contacts 5, 12 is maximum (it is for example larger than 60 mm, for example about 90 mm).

The actuation system 6, 8 (forming means for opening and closing the switch) comprises for example a rod 6 actuated at one of its ends by a lever 8 (see FIGS. 1A, 2, 5) mounted to pivot about an axis 81 (perpendicular to the axis AA' of the circuit-breaker). The other end of the rod 6 is also mounted in rotation on the rod 12 about an axis to move the rod 12 along the axis AA'. In other words, the actuation system converts the rotation of the axis 81 (driven by a mechanism not explained in detail) into a translation of the rod 12 along axis AA'.

The length of the arms of the rod 6 and the lever 8 can be dimensioned according to the needs, in particular the expected timing of the arcing; for example lever 8 has a length of 108 mm and rod 6 a length of 69 mm.

The GIS according to the invention comprises and operates in a gas, for example $SF_6$; alternatively, in order to reduce the greenhouse effects resulting from the use of $SF_6$, the following gas may be used:

a gas comprising heptafluoroisobutyronitrile and/or heptafluoroisopropyl trifluoromethyl ketone (also named 2-butanone, 1,1,1,3,4,4,4-heptafluoro-3-(trifluoromethyl)-(CAS No 756-12-7)), possibly mixed with a gas or a dilution gas comprising at least $CO_2$ and/$O_2$ and/or $N_2$ and/or and/or an oxygenated compound;

or in a gas comprising at least $CO_2$ and/$O_2$ and/or $N_2$ and/or an oxygenated compound.

The invention finds application in GIS which operate under a very high voltage (for example 400 kV, more generally between 100 kV and 500 kV). But the invention is also applicable to higher voltages

We claim:

1. A fast earthing switch for a GIS, comprising:

a movable contact rod, having an end;

a cylinder, fixed to the contact rod and forming a gas chamber around at least part of the contact rod, the contact rod protruding from the cylinder, the gas chamber comprising an outlet around the contact rod so that gas can flow along the contact rod and the end when the contact rod moves from a closed to an open position; and an actuation rod and lever configured to move the contact rod between a closed and an open position.

2. The fast earthing switch according to claim 1, the cylinder having a cylinder end provided with a lip which extends from the cylinder towards the rod and which has a lip end which is separated from the rod, thereby forming an outlet slot with the rod.

3. The fast earthing switch according to claim 1, the cylinder being made of aluminium or of a plastic material.

4. A GIS, comprising:

a metal tank filled with the gas; and the fast earthing switch according to claim 1.

5. The GIS according to claim 4, the gas comprising $SF_6$, or heptafluoroisobutyronitrile and/or heptafluoroisopropyl trifluoromethyl ketone (also named 2-butanone, 1,1,1,3,4,4,4-heptafluoro-3-(trifluoromethyl)-(CAS No 756-12-7)) and/or $CO_2$ and/or $O_2$ and/or $N_2$ and/or an oxygenated compounds comprising both $CO_2$ and a fluorinated compound.

6. A method for opening the earthing switch of the GIS according to claim 4, comprising:

separating the movable contact rod from a fixed contact of the GIS; and blowing a flow of gas along the rod, so that the gas flow follows a shape of the end of the rod.

7. The method according to claim 6, the fixed contact being at a voltage between 3 kV and 30 kV after opening of the switch.

8. The method according to claim 6, the rod moving at a speed comprised between 1 m/s and 10 m/s during a separation of the movable contact rod from the fixed contact.

9. A fast earthing switch for a GIS, comprising:

a movable contact rod, having an end;

a cylinder, fixed to the contact rod and forming a gas chamber around at least part of the contact rod, the gas chamber comprising an outlet around the contact rod so that gas can flow along the contact rod and the end when the contact rod moves from a closed to an open position; and an actuation rod and lever configured to move the contact rod between a closed and an open position;

wherein a distance between an end of the cylinder and the end of the contact rod being between 10 mm and 60 mm.

10. A fast earthing switch for a GIS, comprising:

a movable contact rod, having an end;

a cylinder, fixed to the contact rod and forming a gas chamber around at least part of the contact rod, the gas chamber comprising an outlet around the contact rod so that gas can flow along the contact rod and the end when the contact rod moves from a closed to an open position; and an actuation rod and lever configured to move the contact rod between a closed and an open position;

wherein the outlet having a thickness between 3 mm and 10 mm.

* * * * *